(12) United States Patent
Yamazaki

(10) Patent No.: US 7,974,110 B2
(45) Date of Patent: Jul. 5, 2011

(54) SWITCHING POWER SUPPLY UNIT AND METHOD FOR SETTING SWITCHING FREQUENCY

(75) Inventor: Yukio Yamazaki, Hidaka (JP)

(73) Assignee: Ecopower Design Co., Ltd., Saitama (JP)

( * ) Notice: Subject to any disclaimer, the term of this patent is extended or adjusted under 35 U.S.C. 154(b) by 719 days.

(21) Appl. No.: 11/982,676

(22) Filed: Nov. 2, 2007

(65) Prior Publication Data

US 2008/0106916 A1 May 8, 2008

(30) Foreign Application Priority Data

Nov. 2, 2006 (JP) ................................. 2006-298392
Nov. 2, 2006 (JP) ................................. 2006-298400

(51) Int. Cl.
*H02M 1/00* (2007.01)
(52) U.S. Cl. ....... 363/49; 363/21.1; 363/21.18; 323/901
(58) Field of Classification Search ............... 363/21.01, 363/21.04–21.08, 21.1–21.16, 21.18, 49; 323/901

See application file for complete search history.

(56) References Cited

U.S. PATENT DOCUMENTS

| 5,408,402 A * | 4/1995 | Nonnenmacher | .......... 363/21.09 |
|---|---|---|---|
| 5,856,917 A | 1/1999 | Aonuma et al. | |
| 6,469,913 B2 * | 10/2002 | Hosotani et al. | ................. 363/16 |
| 2003/0076695 A1 * | 4/2003 | Grant et al. | ...................... 363/17 |
| 2004/0037098 A1 | 2/2004 | Konno | |
| 2006/0077698 A1 * | 4/2006 | Arai et al. | .................. 363/21.13 |
| 2006/0209578 A1 | 9/2006 | Takeshita et al. | |

FOREIGN PATENT DOCUMENTS

| JP | 11285254 A | 10/1999 |
|---|---|---|
| JP | 200379146 A | 3/2003 |
| JP | 2004-187479 A | 7/2004 |
| JP | 2004187479 A | 7/2004 |
| JP | 2005-151659 A | 6/2005 |
| JP | 2006262610 A | 9/2006 |
| WO | 9608073 A1 | 3/1996 |

\* cited by examiner

*Primary Examiner* — Harry Behm
*Assistant Examiner* — Matthew Grubb
(74) *Attorney, Agent, or Firm* — Porzio, Bromberg & Newman, P.C.

(57) ABSTRACT

A switching power supply unit is provided which provides improved response for frequency switching with a smooth rise in voltage. The switching power supply unit includes: a rectifier circuit for rectifying an alternating current from an AC power source into a direct current; a switching circuit for switching the current rectified by this rectifier circuit using a switching device; a pulse oscillator circuit for outputting a switching signal to the switching device; and a transformer circuit for stepping a voltage up or down depending on the current switched by this switching circuit. A frequency switching unit is also used to detect a pulse output from the switching circuit. Based on the state of this pulse output, the frequency switching unit changes a resistance using resistors, thereby switching the frequency of the switching signal in the pulse oscillator circuit.

13 Claims, 7 Drawing Sheets

(A)

(B)

- Prior Art -

SWITCHING POWER SUPPLY UNIT AND METHOD FOR SETTING SWITCHING FREQUENCY

BACKGROUND OF THE INVENTION

1. Field of the Invention

The present invention relates to a power saving circuit for reducing the standby power and start-up power of an electric apparatus, a switching power supply unit for exercising control using a switching device, and a method for setting a switching frequency of a switching power supply unit.

2. Description of the Related Art

Power saving circuits for reducing the standby power and the like of electrical equipment have been widely used, for example, as switching power supply units. FIG. 6 shows the circuitry of a conventional switching power supply unit. This switching power supply unit includes such components as an AC power source CN1, a first bridge rectifier D1, a main switching device Q1, a transformer T1, and a pulse oscillator circuit IC1. The first bridge rectifier D1 is connected to the AC power source CN1. The transformer T1 has a primary winding and a secondary winding, and functions as a transformer circuit. The pulse oscillator circuit IC1 outputs a switching signal to the main switching device Q1.

One end of the primary winding of the transformer T1 is connected to the drain of the switching device Q1 in series. The other end of the primary winding is connected to a positive DC terminal of the first bridge rectifier D1. The negative DC terminal of the first bridge rectifier D1 is connected to the source of the switching device Q1. A smoothing capacitor C8 is connected between the positive and negative DC terminals of the first bridge rectifier D1, and thus functions as a DC power source by virtue of its smoothing operation.

A second bridge rectifier D2 is also connected to the AC power source CN1. The pulse oscillator circuit IC1 is connected between the DC terminals of this second bridge rectifier D2. Series capacitors C3 and C6 are connected between the respective terminals of the AC power source CN1 and the AC terminals of the second bridge rectifier D2, so that an alternating current is introduced into the second bridge rectifier D2. The resulting current rectified by the second bridge rectifier D2 is supplied to the pulse oscillator circuit IC1 for start-up. Both ends of a tertiary winding of the transformer T1 are connected to the pulse oscillator circuit IC1 so that this transformer T1 also supplies power.

An output terminal OUT of the pulse oscillator circuit IC1 is connected to the gate of the switching device Q1. A current detection terminal ISNF of the pulse oscillator circuit IC1 is connected to the source of the switching device Q1.

This switching power supply unit also includes an internal detection circuit 11 for detecting a pulse signal supplied from the pulse oscillator circuit IC1. This internal detection circuit 11 controls the frequency of the switching signal from the pulse oscillator circuit IC1. This internal detection circuit 11 includes a pulse detection circuit 12 for detecting the switching signal (pulse output) supplied from the pulse oscillator circuit IC1. In this instance, resistors R16, R17, and R18, and a capacitor C7 are used for that purpose. This pulse detection circuit 12 is connected between the gate of the switching device Q1 and the output terminal OUT of the pulse oscillator circuit IC1, and outputs the detected switching signal to the base of a switching device Q4.

The internal detection circuit 11 also includes a DC signal level conversion circuit 13. This DC signal level conversion circuit 13 is connected between the collector and the emitter of the switching device Q4. This DC signal level conversion circuit 13 is composed of a plurality of NOT circuits IC4A to IC4D, a diode D7, a capacitor C16, and resistors R23 and R27. Through these components, the pulse signal detected by the pulse detection circuit 12 is converted into a DC signal level. If the pulse oscillator circuit IC1 has a relatively long ON time, the capacitor C16 becomes fully electrically charged. In the meantime, the DC signal level becomes high. If the pulse oscillator circuit IC1 has a relatively short ON time, the capacitor C16 does not become fully electrically charged, in which case the DC signal level becomes low. When the DC signal level input to the NOT circuit IC4B of this DC signal level conversion circuit 13 is low, it is turned into a low frequency instruction signal (in this instance, an ON signal). When the DC signal level input is high, it is turned into a high frequency instruction signal (in this instance, an OFF signal).

The internal detection circuit 11 includes a frequency switching circuit 14. This frequency switching circuit 14 has a switching device Q3. The switching device Q3 has a control terminal which is connected to the NOT circuit IC4B of the DC signal level conversion circuit 13. The low frequency instruction signal (ON signal) or the high frequency instruction signal (OFF signal) output from the NOT circuit IC4B is input to the switching device Q3. The input terminal of the switching device Q3 is connected to a first capacitor C2 in series. A second capacitor C17 is connected in parallel with this series circuit consisting of the switching device Q3 and the first capacitor C2.

Consequently, when the low frequency instruction signal (ON signal) is transmitted to the frequency switching circuit 14, the switching device Q3 turns ON. Since the switching device Q3 is ON, the capacitor C2 is charged in order to lower the switching frequency of the pulse oscillator circuit IC1. Conversely, when the high frequency instruction signal (OFF signal) is transmitted to the frequency switching circuit 14, the switching device Q3 turns OFF. Since the switching device Q3 is OFF, the capacitor C2 is discharged in order to increase the switching frequency of the pulse oscillator circuit IC1 for higher power. (For example, see Japanese Patent Application Laid-Open Nos. 2004-187479 and 2005-151659.)

As shown in FIG. 7, the conventional switching power supply unit has a short time constant when starting-up since components such as the capacitor C2 of the frequency switching circuit 14 will not be charged. Thus, the switching signal of the pulse oscillator circuit IC1 always starts with a high frequency H. The high frequency H accelerates the rise in voltage upon start-up. Nevertheless, an overcurrent (surge current) subsequently flows into the pulse oscillator circuit IC1 through the resistor R5, and the circuit IC1 forcefully switches the frequency to a low frequency L for output suppression. Consequently, a problem has existed in that switching from the high frequency H to the low frequency L occurs even under light load, causing a drop X1 in output. Starting with the high frequency H has also resulted in the problem of increased power consumption.

Moreover, since the frequency switching circuit 14 is configured to use the capacitors C17 and C2 for frequency switching, there has been a problem of poor response, which is ascribable to the charging and discharging operations. Specifically, as shown in FIG. 7, the DC signal level rises while the switching signal has the low frequency L. Then, even if the high frequency instruction signal is input to the frequency switching circuit 14, the frequency-switching instruction can actually be transmitted to the pulse oscillator circuit IC1 only with a delay in timing since the capacitor C2 requires time to discharge. As a result, the output voltage becomes high enough before the switching frequency is switched from the low frequency L to the high frequency H. This causes a large drop X2 in the output capacity upon switching, with the problem that smooth output characteristics cannot be obtained.

There has conventionally been another problem in that the second bridge rectifier D2 is composed of four diodes, i.e., with a high parts count and a large circuit size. Introducing the alternating current into this second bridge rectifier D2 requires two series capacitors C3 and C6, which also contributes to the problem of an increased parts count. There has also been the problem that these components consume power.

Furthermore, according to this circuit, the switching signal of the pulse oscillator circuit IC1 starts with the high frequency before converging to an intended frequency. There has thus been the problem of increased power consumption in standby mode. More specifically, the capacitor C7 is yet to be charged during start-up, and the pulse detection circuit 12 thus has a small time constant and starts with a high frequency. Since this circuit is designed so that the pulse oscillator circuit IC1 repeats the ON (start-up) and OFF (stop) operations at regular intervals when in standby mode (power saving mode), starting with a high frequency upon each start-up has produced the problem of increased power consumption.

SUMMARY OF THE INVENTION

It is an object of the present invention to provide a switching power supply unit which reduces a drop in output on such occasions as during start-up and when shifting to a high frequency, with stable rising waveforms even under light load. Another object of the present invention is to provide a power saving circuit with a reduced parts count and smaller power consumption, and a switching power supply unit which uses this power saving circuit.

The foregoing objects have been achieved by the following means.

A first aspect of the present invention is a switching power supply unit including: a rectifier circuit for rectifying an alternating current from an AC power source into a direct current; a switching circuit for switching the current rectified by the rectifier circuit using a switching device; a pulse oscillator circuit for outputting a switching signal to the switching device; a transformer circuit for stepping a voltage up or down using the current switched by the switching circuit; and a frequency switching unit for detecting a pulse output of the switching circuit and changing a resistance using a resistor based on a state of the pulse output, thereby switching a frequency of the switching signal in the pulse oscillator circuit.

In this switching power supply unit according to the first aspect of the present invention, the frequency switching mean may include: an output detection circuit for detecting the pulse output of the switching circuit; a DC signal level conversion circuit for converting the pulse output detected by the output detection circuit into a DC signal level; a comparison circuit for comparing the DC signal level converted by the DC signal level conversion circuit with a reference voltage; and a resistance changing circuit for changing a resistance of a resistor based on the result of comparison by the comparison circuit, thereby switching the frequency of the switching signal in the pulse oscillator circuit.

In the switching power supply unit according to the first aspect of the present invention, the frequency switching unit may include an output detection circuit for detecting the pulse output of the switching circuit, a DC signal level conversion circuit for converting the pulse output detected by the output detection circuit into a DC signal level, a comparison circuit for comparing the DC signal level converted by the DC signal level conversion circuit with a reference voltage, and a resistance changing circuit for changing a resistance of a resistor based on the result of comparison by the comparison circuit, thereby switching the frequency of the switching signal in the pulse oscillator circuit. In this instance, the resistance changing circuit may reduce the resistance of the resistor to increase the frequency of the switching signal when the DC signal level reaches the reference voltage.

In the switching power supply unit according to the first aspect of the present invention, the frequency switching unit may include an output detection circuit for detecting the pulse output of the switching circuit, a DC signal level conversion circuit for converting the pulse output detected by the output detection circuit into a DC signal level, a comparison circuit for comparing the DC signal level converted by the DC signal level conversion circuit with a reference voltage, and a resistance changing circuit for changing a resistance of a resistor based on the result of comparison by the comparison circuit, thereby switching the frequency of the switching signal in the pulse oscillator circuit. In this instance, the resistance changing circuit may be capable of changing the resistance in a plurality of levels.

In the switching power supply unit according to the first aspect of the present invention, the frequency switching unit may include an output detection circuit for detecting the pulse output of the switching circuit, a DC signal level conversion circuit for converting the pulse output detected by the output detection circuit into a DC signal level, a comparison circuit for comparing the DC signal level converted by the DC signal level conversion circuit with a reference voltage, and a resistance changing circuit for changing a resistance of a resistor based on the result of comparison by the comparison circuit, thereby switching the frequency of the switching signal in the pulse oscillator circuit. In this instance, the resistance changing circuit may include a first resistor and a second resistor selectively connectable to the first resistor in parallel, may connect the first resistor alone to set the switching signal to a low frequency if the DC signal level does not reach the reference voltage, and may connect the first resistor and the second resistor in parallel to set the switching signal to a high frequency if the DC signal level reaches the reference voltage.

In the switching power supply unit according to the first aspect of the present invention, the frequency switching unit may include an output detection circuit for detecting the pulse output of the switching circuit, a DC signal level conversion circuit for converting the pulse output detected by the output detection circuit into a DC signal level, a comparison circuit for comparing the DC signal level converted by the DC signal level conversion circuit with a reference voltage, and a resistance changing circuit for changing a resistance of a resistor based on the result of comparison by the comparison circuit, thereby switching the frequency of the switching signal in the pulse oscillator circuit. In this instance, the output detection circuit may detect, as the pulse output, either one of a pulse voltage to be applied to the switching circuit and a pulse current of the switching circuit intended for overcurrent detection.

In the switching power supply unit according to the first aspect of the present invention, the frequency switching unit may include an output detection circuit for detecting the pulse output of the switching circuit, a DC signal level conversion circuit for converting the pulse output detected by the output detection circuit into a DC signal level, a comparison circuit for comparing the DC signal level converted by the DC signal level conversion circuit with a reference voltage, and a resistance changing circuit for changing a resistance of a resistor based on the result of comparison by the comparison circuit, thereby switching the frequency of the switching signal in the pulse oscillator circuit. In this instance, the comparison circuit may include a bias circuit for applying a bias voltage to the DC signal level depending on the result of comparison.

The switching power supply unit according to the first aspect of the present invention can further include an external control circuit capable of forcefully changing the resistance of the frequency switching unit in response to an external signal.

The switching power supply unit according to the first aspect of the present invention can further include a series capacitor connected at one end thereof to an AC terminal of the rectifier circuit, and half-wave rectifier means having a single AC terminal connected to the other end of the series capacitor. In this instance, the half-wave rectifier means may include a first diode interposed between the single AC terminal and a positive DC terminal so as to pass a current from the single AC terminal to the positive DC terminal, and a second diode interposed between the single AC terminal and a negative DC terminal so as to pass a current from the negative DC terminal to the single AC terminal. Further to this, the pulse oscillator circuit may be connected between the positive DC terminal and the negative DC terminal of the half-wave rectifier means, and a negative DC terminal of the rectifier circuit may be connected to the negative DC terminal of the half-wave rectifier means.

The switching power supply unit according to the first aspect of the present invention can further include a transformer for stepping a voltage up or down using the current switched by the switching circuit. In this instance, the pulse oscillator circuit may be connected between both ends of an auxiliary winding of the transformer.

A second aspect of the present invention is a power saving circuit including: a rectifier circuit for rectifying an alternating current into a direct current, being connected to an AC terminal of an AC power source; a switching circuit for switching the current rectified by the rectifier circuit using a switching device; a pulse oscillator circuit for outputting a switching signal to the switching device; a series capacitor connected at one end to the AC terminal; and half-wave rectifier means having a single AC terminal connected to the other end of the series capacitor. In this instance, the half-wave rectifier means may include a first diode interposed between the single AC terminal and a positive DC terminal so as to pass a current from the single AC terminal to the positive DC terminal, and a second diode interposed between the single AC terminal and a negative DC terminal so as to pass a current from the negative DC terminal to the single AC terminal. Further to this, the pulse oscillator circuit may be connected between the positive DC terminal and the negative DC terminal of the half-wave rectifier means, and a negative DC terminal of the rectifier circuit may be connected to the negative DC terminal of the half-wave rectifier means.

The power saving circuit according to the second aspect of the present invention can further include a transformer for stepping a voltage up or down using the current switched by the switching circuit. In this instance, the pulse oscillator circuit may be connected between both ends of an auxiliary winding of the transformer.

The power saving circuit according to the second aspect of the present invention can further include frequency switching unit for detecting a pulse output of said switching circuit and changing a resistance by using a resistor based on a state of the pulse output, thereby switching a frequency of the switching signal in said pulse oscillator circuit.

The power saving circuit according to the second aspect of the present invention can further include frequency switching unit for detecting a pulse output of the switching circuit and changing a resistance by use of a resistor based on a state of the pulse output, thereby switching a frequency of the switching signal in the pulse oscillator circuit. In this instance, the frequency switching mean may include an output detection circuit for detecting the pulse output of the switching circuit, a DC signal level conversion circuit for converting the pulse output detected by the output detection circuit into a DC signal level, a comparison circuit for comparing the DC signal level converted by the DC signal level conversion circuit with a reference voltage, and a resistance changing circuit for changing a resistance of a resistor based on the result of comparison by the comparison circuit, thereby switching the frequency of the switching signal in the pulse oscillator circuit.

A third aspect of the present invention is a method for setting a switching frequency of a switching device in a switching power supply unit. The method can include the steps of: connecting a resistance changing circuit to a frequency setting terminal of a pulse oscillator circuit for outputting a switching signal to the switching device, the resistance changing circuit being capable of changing a resistance by using a resistor; starting the pulse oscillator circuit to oscillate while the resistance changing circuit makes the switching signal start with a low frequency; and, when an output increases, changing the resistance of the resistance changing circuit so that the switching signal shifts to a high frequency.

According to the present invention, the frequency switching unit changes the resistance by use of a resistor. This improves the response of the frequency switching timing and, in particular, makes it possible to smoothly shift to the high frequency when starting-up. The use of the resistor in the frequency switching unit also makes it possible to start the switching signal with a low frequency. This improves the stability at start time, and can reduce the power consumption.

Moreover, according to the present invention, the half-wave rectifier means makes it possible to form the power saving circuit or the switching power supply unit in a simple configuration with a lower parts count. This can reduce the manufacturing costs. In addition, the one single series capacitor introduces the current to the first diode through the single AC terminal for half-wave rectification, and the second diode discharges this series capacitor in order to prepare for the next half-wave rectification in a short time. This allows efficient rising with a small time constant. Since the frequency switching unit uses the resistor to change the resistance for frequency switching, it is possible to start with a low frequency. The power consumption can thus be reduced when the pulse oscillator circuit repeats the start-up.

BRIEF DESCRIPTION OF THE DRAWINGS

The above and other objects, features and advantages of the present invention will become apparent from the following description and appended claims, taken in conjunction with the accompanying drawings.

DETAILED DESCRIPTION OF THE PREFERRED EMBODIMENTS

Hereinafter, a preferred embodiment of the present invention will be described in detail with reference to the drawings.

Figure 1:
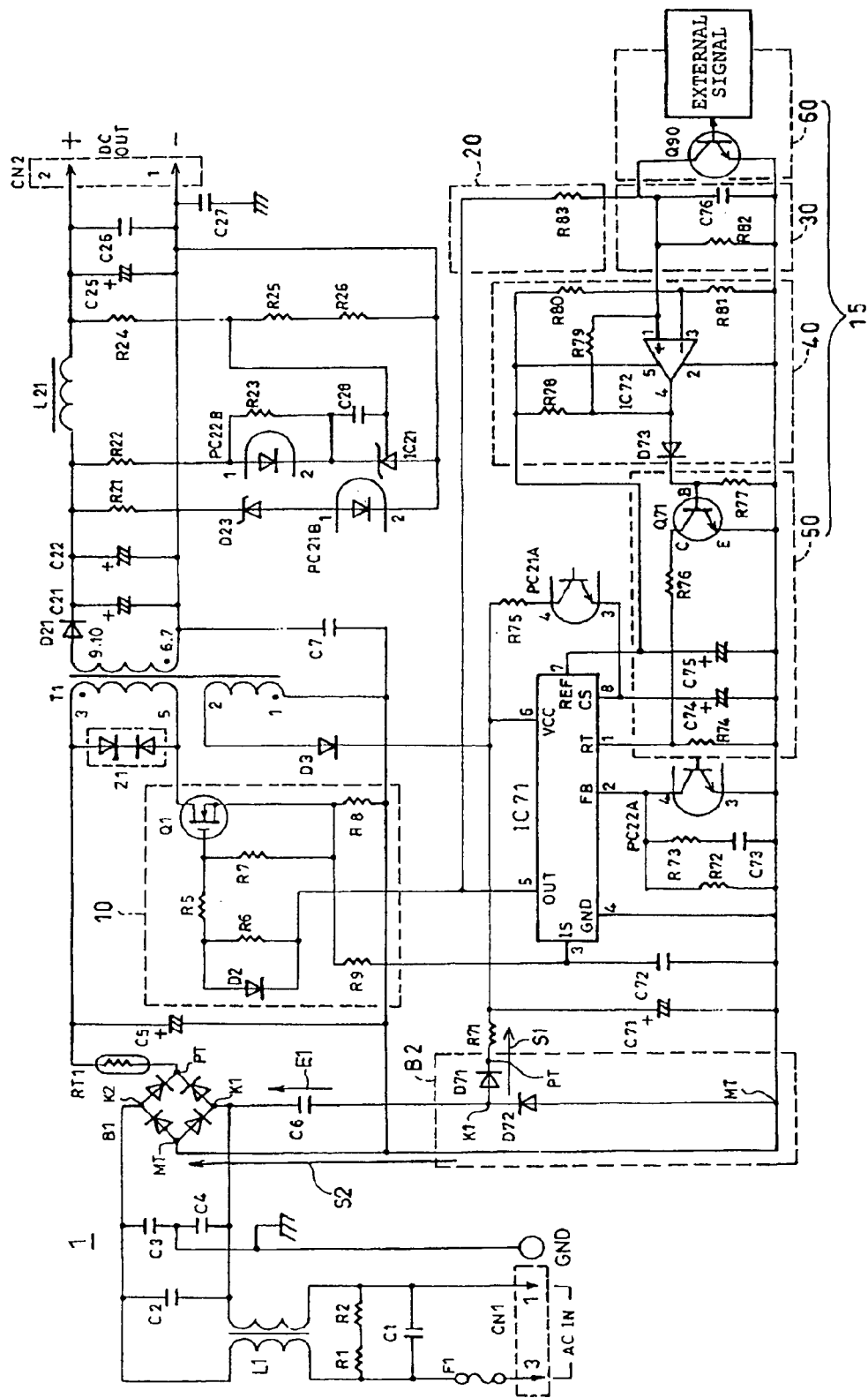
FIG. 1 is a circuit diagram showing a switching power supply unit which uses a power saving circuit according to an embodiment of the present invention.

FIG. 1 is a circuit diagram showing a switching power supply unit 1 which uses a power saving circuit according to one embodiment of the present invention. The switching power supply unit 1 includes an AC power source CN1, a first full-wave bridge rectifier B1 and a second half-wave rectifier circuit B2, a switching circuit 10, a transformer T1, a pulse oscillator circuit IC71, and frequency switching unit 15. The first full-wave bridge rectifier B1 and the second half-wave rectifier circuit B2 are connected to the AC power source CN1, and rectify the alternating current into direct currents. The switching circuit 10 switches the current rectified by the first full-wave bridge rectifier B1. The transformer T1 steps the voltage up or down depending on the direct current switched by the switching circuit 10. The pulse oscillator circuit IC71 outputs a switching signal to the switching circuit 10. The frequency switching unit 15 switches the frequency of the switching signal from the pulse oscillator circuit IC71. In the diagram, the symbol PC represents a photocoupler, C represents a capacitor, D represents a diode, and R represents a resistor. The second half-wave rectifier circuit B2 performs half-wave rectification on the alternating current from the AC power source CN1, and supplies the resulting direct current to the pulse oscillator circuit IC71.

The switching circuit 10 includes an EFT or main switching device Q1. The direct current from the first full-wave bridge rectifier B1 is switched by this main switching device Q1. An output terminal OUT of the pulse oscillator circuit IC71 is connected to the gate of the main switching device Q1. A current detection terminal IS of this pulse oscillator circuit IC71 is connected to the source of the main switching device Q1.

The transformer T1 has a primary winding, a secondary winding, and an auxiliary winding (tertiary winding). The primary winding and secondary winding are insulated from each other. The primary winding of the transformer T1 is connected at one end to the drain of the main switching device Q1. The source of this switching device Q1 is connected to a negative DC terminal MT of the first full-wave bridge rectifier B1. The other end of the primary winding of the transformer T1 is connected to a positive DC terminal PT of the first full-wave bridge rectifier B1.

The two AC terminals K1 and K2 of the first full-wave bridge rectifier B1 are connected to AC electrodes 1 and 3 of the AC power source CN1, respectively. Further to this, a smoothing capacitor C5 is connected between the DC terminals PT and MT of the first full-wave bridge rectifier B1. As a result, the current from the AC power source CN1 is rectified through the first full-wave bridge rectifier B1, and is smoothed further so as to function as a DC power source.

The positive terminal on the secondary winding side of the transformer T1 is connected to a rectifying diode D21 and a ripple-smoothing reactance L21 in series. A capacitor C21 and other components are interposed between the positive and negative terminals of the secondary winding, so as to repeat charging and discharging of an electrical current. Consequently, the switching power supply unit 1 functions as a flyback converter.

Either one of the AC terminals 1 and 3 of the AC power source CN1 (in this instance, the AC terminal 1) is connected to one end of a series capacitor C6. The other end of this series capacitor C6 is connected to a single AC electrode K1 of the second half-wave rectifier circuit B2.

The second half-wave rectifier circuit B2 is connected to the AC power source CN1 so as to be in parallel with the first full-wave bridge rectifier B1. The second half-wave rectifier circuit B2 is composed of two diodes D71 and D72, instead of bridge configuration with four diodes. The second half-wave rectifier circuit B2 therefore has the single AC terminal K1. As mentioned previously, the single AC terminal K1 of this second half-wave rectifier circuit B2 is connected to the one AC terminal 1 of the AC power source CN1 through the series-connected capacitor C6. As a result, the series capacitor C6 repeats being charged and discharged with the alternating current from the AC power source CN1 while functioning to introduce the current into the second half-wave rectifier circuit B2.

The AC terminal K1 of the second half-wave rectifier circuit B2 is also connected with the first diode D71 in series so as to pass an alternating current from the capacitor C6 alone. The other side of this first diode D71 that is opposite to the single AC terminal K1 thus makes a positive DC terminal PT. In other words, the first diode D71 is interposed between the single AC terminal K1 and the positive DC terminal PT, and this first diode D71 passes a current S1 from the first AC terminal K1 to the positive DC terminal PT. The second diode D72 is interposed between the foregoing AC terminal K1 and a negative DC terminal MT of the second half-wave rectifier circuit B2, so as to pass a current from the negative DC terminal MT to the AC terminal K1. The presence of this second diode D72 makes it possible to release a residual charge from the capacitor C6 to the AC power source CN1 (see the arrow E1). As above, since the residual charge in the capacitor C6 is released upon each cycle of half-wave rectification, it possible to prepare for the next charging in the next half-wave rectification. This can achieve efficient rectification with an increase in output.

The negative DC terminal MT of the second half-wave rectifier circuit B2 is also connected to the negative DC terminal MT of the first full-wave bridge rectifier B1. Consequently, the current that is half-wave rectified by this second half-wave rectifier circuit B2 and is introduced to the pulse oscillator circuit IC71 passes the negative DC terminal MT of the half-wave rectifier circuit B2 and the negative DC terminal MT of the full-wave bridge rectifier B1 in this order, and flows to the AC power source CN1, as shown by the arrow S2.

A limiting resistor R71 is connected to the positive DC terminal PT of the second half-wave rectifier circuit B2 in series. This limiting resistor R71 limits the current that flows from the AC power source CN1 through the series resistor C6 and the first diode D71.

A smoothing capacitor C71 is connected between both the DC terminals PT and MT of the second half-wave rectifier circuit B2. It functions as a DC power source through the rectifying operation of the second half-wave rectifier circuit B2. The pulse oscillator circuit IC71 is also connected between the DC terminals PT and MT of the second half-wave rectifier circuit B2. Specifically, the positive DC terminal PT of the second half-wave rectifier circuit B2 is connected to a power input terminal VCC of the pulse oscillator circuit IC71. The negative DC terminal MT of the second half-wave rectifier circuit B2 is connected to an RT terminal and a GND terminal of the pulse oscillator circuit IC71. As a result, the DC voltage generated through the capacitor C6, the second half-wave rectifier circuit B2, and the smoothing capacitor C71 is applied to the pulse oscillator circuit IC71 without the intervention of any resistor. Since this second half-wave rectifier circuit B2 is composed of the two diodes D71 and D72, it consumes little power. Such factors as the capacitances of the series capacitor C6 and the smoothing capacitor C71 can be adjusted to set the time constant for a power rise freely, even allowing a quick rise of power. When compared to a bridge configuration, the smaller parts count can result in a reduction in manufacturing costs.

The auxiliary winding of the transformer T1 is connected at one end to the positive DC terminal PT of the second half-wave rectifier circuit B2 through a diode D3. The other end of the auxiliary winding of the transformer T1 is connected to the negative DC terminal MT of the second half-wave rectifier circuit B2. The current occurring from the auxiliary winding is thus charged into the smoothing capacitor C71. The current from the auxiliary winding is proportional to the output of a load CN2. The higher the output, the more the auxiliary winding functions as a power source for the pulse oscillator circuit IC71, so that the power source from the second half-wave rectifier circuit B2 stops automatically.

The frequency switching unit 15 detects the pulse output from the switching circuit 10 and changes a resistance based on the state of the pulse output, thereby switching and controlling the frequency of the switching signal from the pulse oscillator circuit IC71. Specifically, the frequency switching unit 15 includes an output detection circuit 20, a DC signal level conversion circuit 30, a comparison circuit 40, a resistance changing circuit 50, and an external control circuit 60.

The output detection circuit 20 has a resistor R83, and its input side is connected to the output terminal OUT of the pulse oscillator circuit IC71. This output detection circuit 20 can thus detect the switching signal (pulse output) supplied from the pulse oscillator circuit IC71. Meanwhile, the output side of this output detection circuit 20 is connected to the DC signal level conversion circuit 30.

The DC signal level conversion circuit 30 is composed of a resistor R82 and a capacitor C76 which are connected in parallel. As mentioned previously, this DC signal level conversion circuit 30 receives the pulse output detected by the output detection circuit 20. It converts the pulse output into a DC signal level using the capacitor C76 and the resistor R82. In fact, the charging and discharging of the capacitor C76 with the pulse signal produce a DC signal level that traces a sawtooth waveform such as that shown in FIG. 2A. It should be appreciated that the detected value of the DC signal level can be set arbitrarily by freely adjusting the resistor R82 and the capacitor C76 in circuit configuration, resistance, and capacitance. This DC signal level is then output to the comparison circuit 40 to be described below.

The comparison circuit 40 includes a comparator IC72, a reference resistor R81, and a bias resistor R79 which functions as a bias circuit. The comparator IC72 compares the DC signal level that is input from the DC signal level conversion circuit 30 and a reference voltage that is generated by the reference resistor R81, and outputs an ON signal if the DC signal level reaches or exceeds the reference voltage. Since the output side of the comparison circuit 40 is connected to the resistance changing circuit 50 (specifically, to the base of a switching device Q71) through a diode D73, the foregoing ON signal is output to the switching device Q71. Conversely, if the DC signal level is below the reference voltage, an OFF signal is output (no signal is output) so as to prevent the switching device Q71 of the resistance changing circuit 50 from undergoing its predetermined base current.

Figure 2:
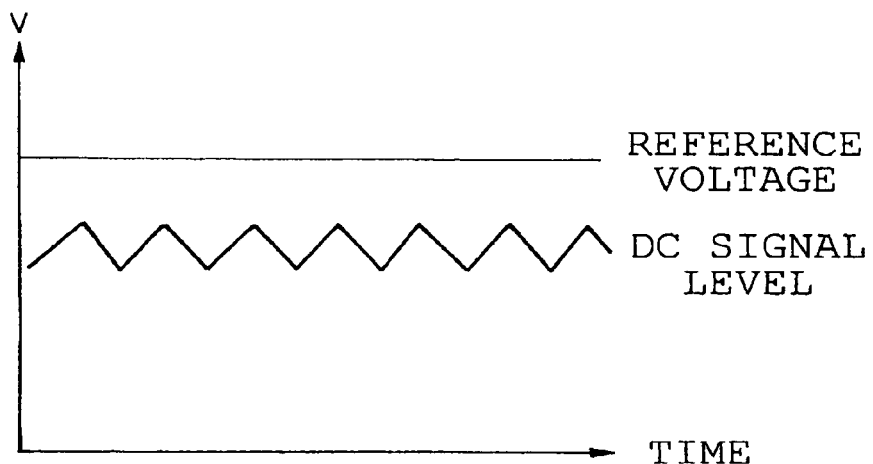
FIGS. 2A and 2B are graphs showing the DC signal level of the switching power supply unit.
Figure 2:
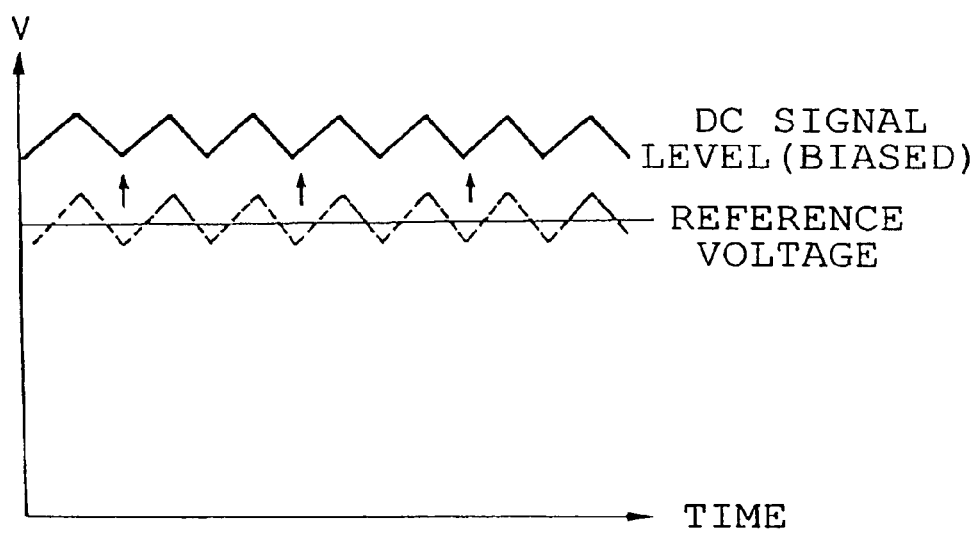

The bias circuit or bias resistor R79 is connected between the output side and the DC signal level input side of the comparator IC72. When the comparator IC72 outputs the ON signal, the bias resistor R79 simultaneously applies a bias voltage to the DC signal level on the input side, thereby increasing the voltage level. As a result, once the ON signal is output, the DC signal level is increased to greatly exceed the reference voltage, as shown in FIG. 2B. The bias circuit can thus prevent the comparator IC72 from chattering (continually repeating the ON and OFF operations) depending on the DC signal level of sawtooth waveform.

The resistance changing circuit 50 includes the switching device Q71 and two resistors R74 and R76. The base of the switching device Q71 receives the ON/OFF signal from the comparator circuit 40. The resistor R76 and the switching device Q71 (collector and emitter) are connected in series. The other resistor R74 is connected in parallel to this series circuit consisting of the resistor R76 and the switching device Q71.

If the OFF signal is input to the base of the switching device Q71 and no current flows between the collector and the emitter, then the resistor R76 connected in parallel undertakes no operation while the resistor R74 functions independently. Conversely, if the ON signal is input to the base of the switching device Q71 and a current flows between the collector and the emitter, the resistor R76 comes into operation. The resistors R74 and R76 are thus connected in parallel, producing a combined resistance of smaller value. That is, the resistance of this resistance changing circuit 50 can be changed depending on the switching state of the switching device Q71, thereby switching the voltage level to be applied to the RT terminal. In the pulse oscillator circuit IC71, the frequency of the switching signal is determined uniquely by the voltage level on the RT terminal. In this instance, the frequency can be controlled in two possible levels.

The external control circuit 60 is connected in parallel with the DC signal level conversion circuit 30. It is configured to receive an external signal and create a short circuit across the capacitor C76 of the DC signal level conversion circuit 30. More specifically, the external control circuit 60 includes a switching device Q90. The capacitor C76 is connected between the collector and the emitter of the switching device Q90, and the external signal is input to the gate. A signal input to the gate establishes conduction between the collector and the emitter, thereby short-circuiting the capacitor C76. This forces the DC signal level down to zero so that the pulse oscillator circuit IC71 can shift into a low frequency state, as will be described later, thereby entering a power saving mode or standby mode.

In the present embodiment, if the comparison circuit 40 outputs the OFF signal and no current flows through the switching device Q71 of the resistance changing circuit 50, the switching signal of the pulse oscillator circuit IC71 is set to a low frequency, or more specifically, a frequency in the range of 17 kHz to 25 kHz inclusive. If the comparison circuit 40 outputs the ON signal and a current flows through the switching device Q71 of the resistance changing circuit 50, the switching signal of the pulse oscillator circuit IC71 is set to a high frequency, or more specifically, a frequency in the range of 70 kHz to 100 kHz inclusive. As described above, according to the frequency switching unit 15, it is possible to use the two fixed frequencies by changing the resistance to two possible settings.

Since the resistance changing circuit 50 uses the combination of the resistors R74 and R76 to change the resistance, it is possible to start the switching signal of the pulse oscillator circuit IC71 with the low frequency when starting the switching power supply unit 1. Moreover, when the load increases in power to push up the DC signal level, the resistance can be switched almost at the same timing as the output of the comparator 40. That is, it is possible to shift to the high frequency quickly.

The switching power supply unit 1 having the foregoing configuration operates as follows.

The alternating current arising between the terminals of the AC power source CN1 is full-wave rectified by the first full-wave bridge rectifier B1. The direct current generated by this rectification charges the smoothing capacitor C5 to make a DC power source. Meanwhile, the alternating current also flows to the series capacitor C6 and is half-wave rectified by the second half-wave rectifier circuit B2. Since the second half-wave rectifier circuit B2 has only a single AC terminal K1, the second half-wave rectifier circuit B2 rectifies the half-wave current alone. The charging and discharging of the capacitor C6 and the half-wave rectification process of the second half-wave rectifier circuit B2 are repeated to charge the smoothing capacitor C71. When the voltage across the terminals of this smoothing capacitor C71 exceeds the starting voltage of the pulse oscillator circuit IC71, the pulse oscillator circuit IC71 is activated in order to output the switching signal. As a result, the main switching device Q1 of the switching circuit 10 comes into conduction. The time constant of the second half-wave rectifier circuit B2 can be adjusted via the capacitor C6 when starting the DC power source. It is therefore possible to optimize the start-up of the pulse oscillator circuit IC71. It should be appreciated that the primary role of the second half-wave rectifier circuit B2 is to activate the pulse oscillator circuit IC71. After the activation, the pulse oscillator circuit IC71 is supplied with the current from the auxiliary winding of the transformer T1 through the diode D3.

The direct-current power charged into the smoothing capacitor C5 through the first full-wave bridge rectifier B1 produces an intermittent primary current through the main switching device Q1 which repeats the ON and OFF operations. It should be appreciated that the ON/OFF operation of this main switching device Q1 is effected by the switching signal (drive pulse) output from the output terminal OUT of the pulse oscillator circuit IC71.

The primary current flows along the series circuit consisting of the primary winding of the transformer T1, the main switching device Q1, and a primary current detection resistor R8. This primary current excites the secondary winding of the transformer T1. The excited secondary winding then emits energy to charge up the capacitor C21 and the like. The capacitor C21 discharges the electrical charge, thereby applying the DC power to the load CN2. It is important to note that the positive terminal of the secondary winding of the transformer T1 is connected to a photocoupler PC21B via a resistor R21. This photocoupler PC21B detects an overvoltage on the output side. This detection output is input to an overvoltage control terminal CS of the pulse oscillator circuit IC71 through a photocoupler PC21A. Similarly, the positive terminal of the secondary winding of the transformer T1 is connected to a photocoupler PC22B via a resistor R22. This photocoupler PC22B detects the state of the voltage output. This voltage output is input to a voltage feedback terminal FB of the pulse oscillator circuit IC71 through a photocoupler PC22A. This makes it possible to stabilize the voltage through conduction control of the switching signal.

Now, when the load CN2 output increases, a current is induced on the auxiliary winding of the transformer T1 and is rectified through the diode D3 to charge the smoothing capacitor C71. If the output of the third winding of the transformer T1 exceeds that of the second half-wave rectifier circuit B2, the second half-wave rectifier circuit B2 stops its rectifying function. That is, the main switching device enters stationary mode.

Conversely, if the load CN2 decreases to zero or an extremely small value in output, the output of the auxiliary winding of the transformer T1 becomes near zero accordingly in proportion to the decrease. The auxiliary winding thus stops charging the smoothing capacitor C71. As a result, the smoothing capacitor C71 starts being charged by the AC power source CN1 again through the series capacitor C6 and the second half-wave rectifier circuit B2, and the pulse oscillator circuit IC71 runs on this voltage. That is, the main switching device enters standby mode.

Figure 3:
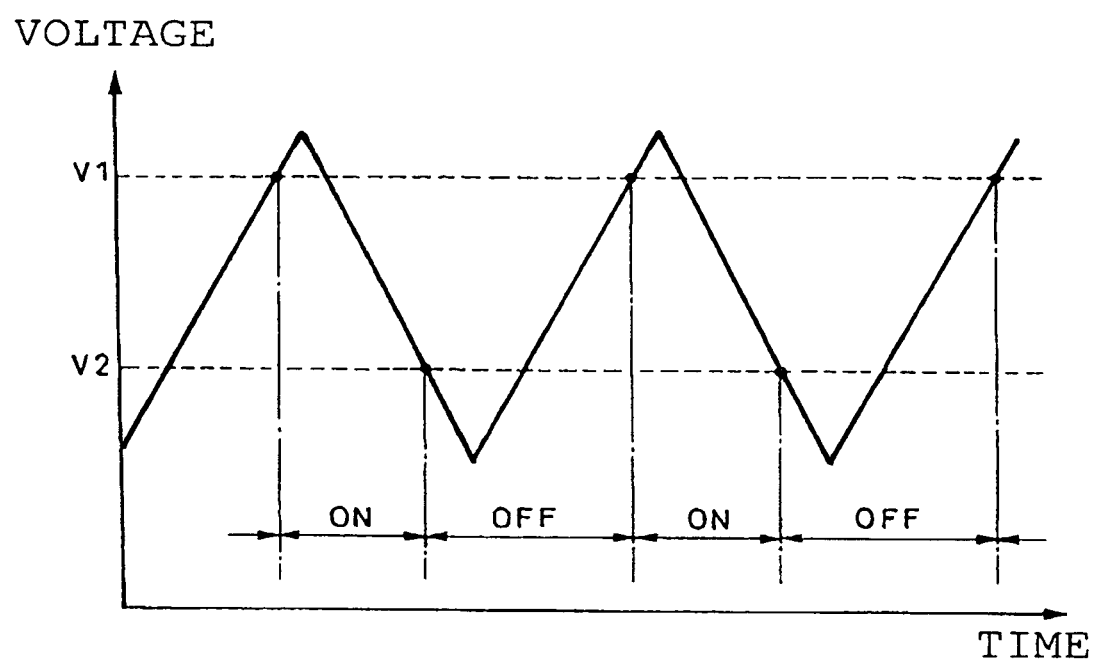
FIG. 3 is a graph showing the start and stop states of a pulse oscillator circuit of the switching power supply unit in standby mode.

The pulse oscillator circuit IC71 has a difference between its starting voltage and stop voltage. Specifically, the starting voltage is set to be higher and the stop voltage lower. In standby mode, as shown in FIG. 3, the smoothing capacitor C71 is charged by the capacitor C6 and the second half-wave rectifier circuit B2 in order to rise the voltage thereof. When the starting voltage V1 is exceeded, the pulse oscillator circuit IC71 is thus activated to issue the switching signal. Meanwhile, the pulse oscillator circuit IC71 that has been activated consumes power. When the voltage of the smoothing capacitor C71 falls below the stop voltage V2, the pulse oscillator IC71 is stopped. After stopping, the smoothing capacitor C71 is gradually charged by the capacitor C6 and the second half-wave rectifier circuit B2 again resulting in a rise in voltage. When the starting voltage V1 is exceeded, the pulse oscillator circuit IC71 is activated to issue the switching signal. Through the repetition of these operations, the pulse oscillator circuit IC71 repeats the ON and OFF operations intermittently. It is important to note that, according to the present embodiment, the second half-wave rectifier circuit B2 has only one AC terminal, the single AC terminal K1. Since the smoothing capacitor C71 is charged by the half-wave rectification, the capacitor C6 can be appropriately adjusted to make the charging rate of the smoothing capacitor C71 smaller. This increases the adjustable range of the time constant.

As a result, it is possible to increase the OFF period of the pulse oscillator circuit IC71, thereby making the power consumption in standby mode considerably smaller. The second half-wave rectifier circuit B2 itself also small consumes very little power since it functions with the two diodes D71 and D72. As will be described later, the pulse oscillator circuit IC71 is configured to start with the low frequency, which can reduce the power consumption when repeating the start-up procedure.

In standby mode, the pulse oscillator circuit IC71 repeats start-up and stop intermittently. When the load CN2 increases at an arbitrary timing, the transformer T1 rises at the next start-up timing and resumes supplying power to the pulse oscillator circuit IC71 through the auxiliary winding, thereby entering stationary mode.

The pulse output from the output terminal OUT of the pulse oscillator circuit IC71 is detected by the output detection circuit 20 of the frequency switching unit 15, and is transmitted to the DC signal level conversion circuit 30 through the resistor R83 of this circuit 20. The DC signal level conversion circuit 30 converts the transmitted pulse output into a DC signal level. Specifically, the electrical charge of the switching signal, or rectangular wave signal, is charged into the capacitor C76. If the pulse oscillator circuit IC71 has a relatively long ON time (high duty ratio), the capacitor 76 becomes fully electrically charged and thus produces a high DC signal level. Conversely, if the pulse oscillator circuit IC71 has a relatively short ON time (low duty ratio), the capacitor 76 is not sufficiently electrically charged and thus produces a low DC signal level. The signal converted into the direct-signal level is output to the comparison circuit 40.

The comparator IC72 of the comparison circuit 40 compares the foregoing DC signal level and the reference voltage and issues the ON signal unless the DC signal level reaches or exceeds the reference voltage. Conversely, if the DC signal level is lower than the reference voltage, the comparator 72 issues the OFF signal. Since the switching power supply unit 1 always starts with a low DC signal level, this comparison circuit 40 also starts with the OFF signal.

The ON/OFF signal output from the comparison circuit 40 is input to the base of the switching device Q71 in the resistance changing circuit 50. The ON signal brings the collector and the emitter of the switching device Q71 into conduction, connecting the two resistors R74 and R76 in parallel for low resistance. The OFF signal, however, brings the collector and the emitter of the switching device Q71 out of conduction, so that the resistor R74 provides high resistance by itself. As described previously, the switching power supply unit 1 starts with the OFF signal. The resistance changing circuit 50 therefore always starts with the state of having high resistance, and decreases in resistance when switched to the ON signal.

Figure 4:
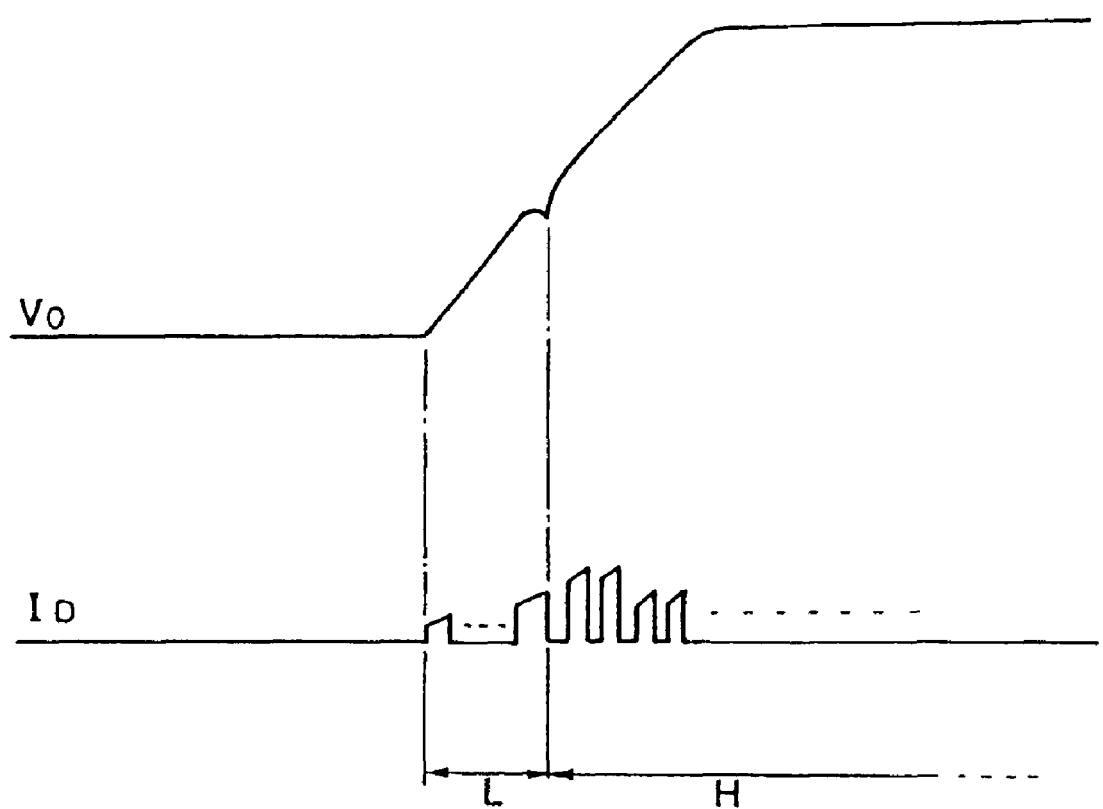
FIG. 4 is a graph showing a rise in voltage and frequency when starting the switching power supply unit.

The frequency of the switching signal from the pulse oscillator circuit IC71 is set depending on the input voltage on the frequency change terminal RT. The frequency is a low value when the resistance of the resistance changing circuit 50 is high, and is a high value when the resistance is low. During start-up, the switching signal starts with the low frequency, and is switched to the high frequency as the power increases. That is, as shown in FIG. 4, when starting the switching power supply unit 1, the switching signal always starts with the low frequency L, and shifts to the high frequency H for higher power as the load increases. Consequently, it is also possible to increase the output voltage smoothly. The resistance-based frequency switching reduces any temporal delay in the switching timing, and makes it possible to quickly switch to the high frequency when the set voltage is reached as the voltage is increasing. This can avoid frequency switching in a high voltage state such as under a rated voltage, and can thus suppress a drop from the rated voltage. Conversely, if the load decreases subsequently, the frequency automatically shifts down to the low value with a resultant reduction in power. As far as standby mode is concerned, it is therefore possible to maintain the low frequency state all the time.

Figure 5:
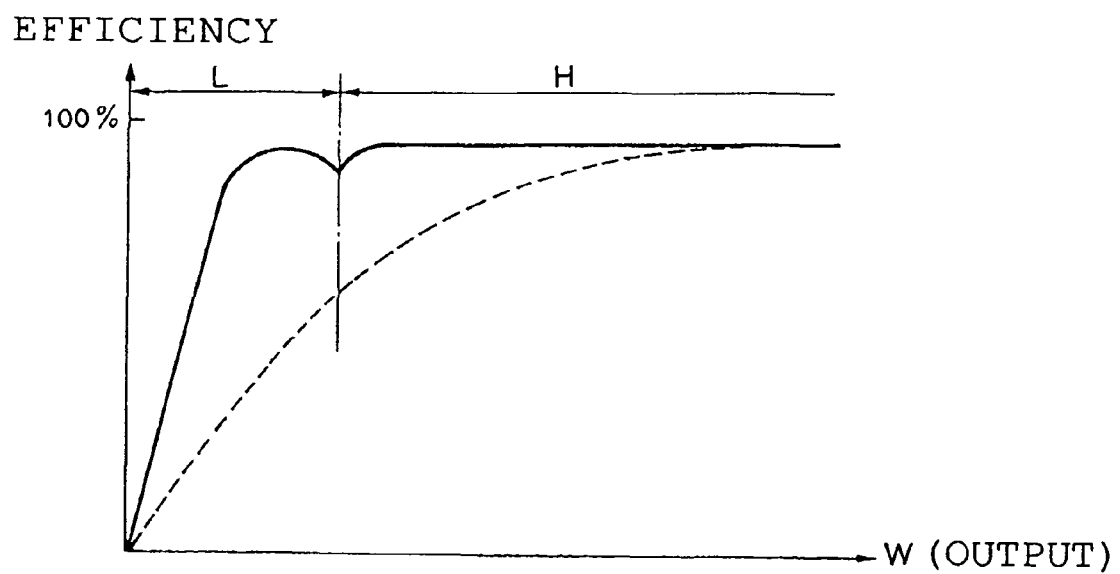
FIG. 5 is a graph showing the efficiency of the switching power supply unit.
Figure 6:
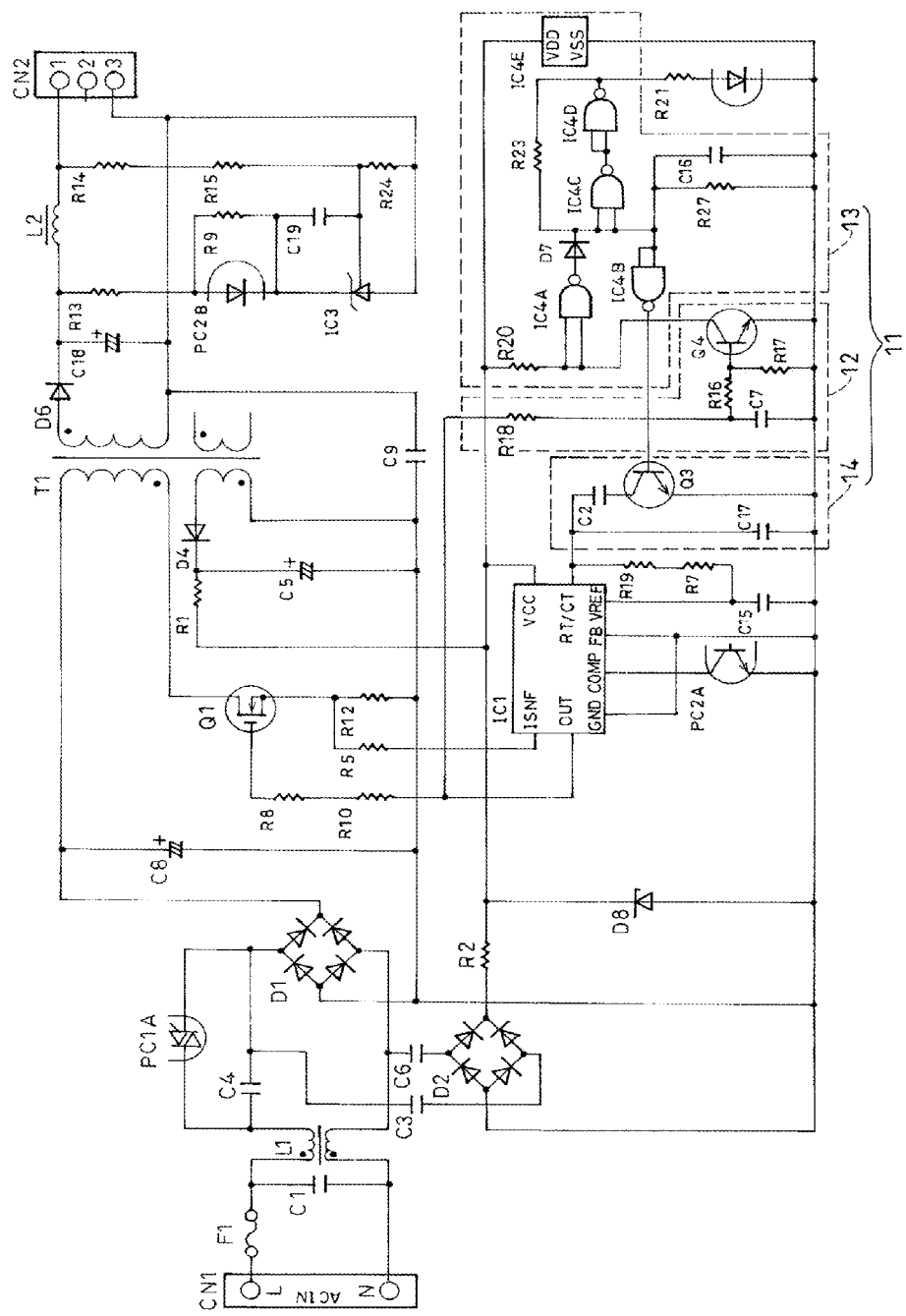
FIG. 6 is a circuit diagram of a conventional switching power supply unit.
Figure 7:
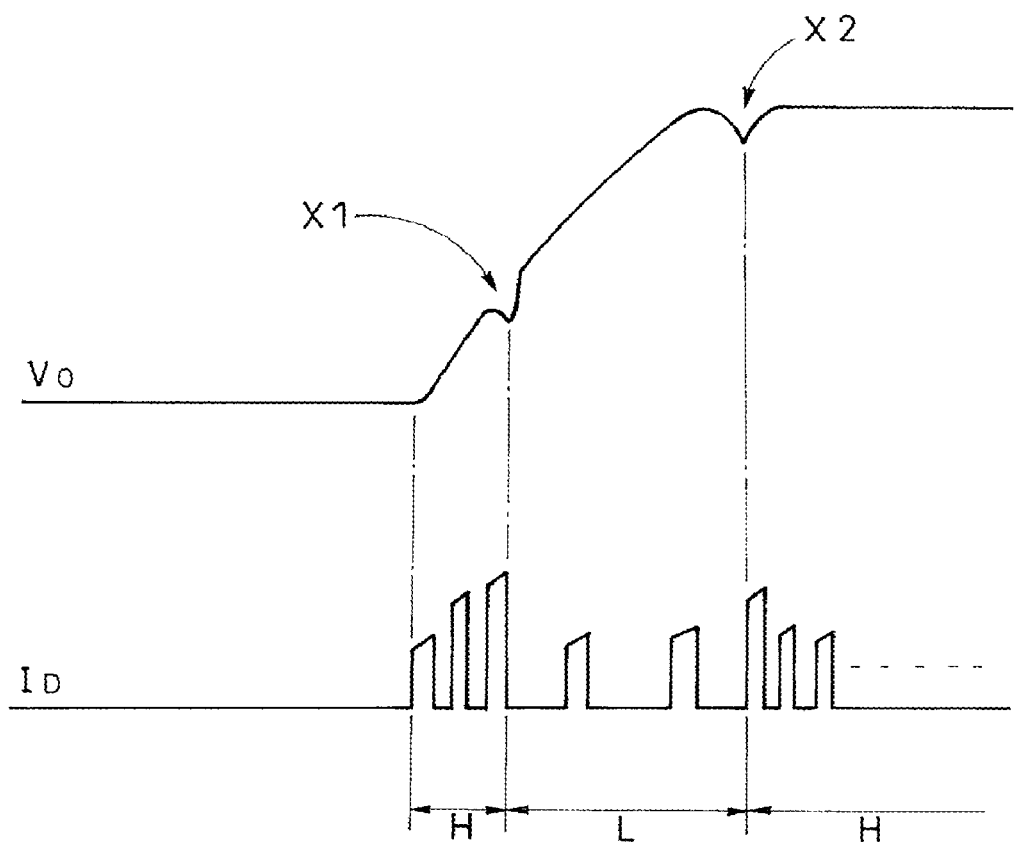
FIG. 7 is a graph showing a rise in voltage and frequency when starting the conventional switching power supply unit.

FIG. 5 is a graph showing the relationship between the output and efficiency of the switching power supply unit 1. At low output, the frequency is kept at a constant low value L such as 20 kHz all the time. It is therefore possible to maintain high efficiency. At high output, the frequency is also kept at a constant high value H such as 80 kHz all the time. Thus, the efficiency can always be maintained at a high level. As above, the low frequency L is set within the predetermined range of 17 kHz to 25 kHz inclusive, and the high frequency H is set within the predetermined range of 70 kHz to 100 kHz inclusive. These fixed settings can consequently improve the efficiency when compared to the cases where the frequency is continuously controlled from several kilohertz to 100 kHz or so in accordance with the output, as shown by the dotted line in FIG. 5. In particular, the efficiency improves significantly at lower frequencies (low output) on such occasions as during start-up and when in power saving mode (standby mode). This can even reduce the power consumption of the entire unit through a synergistic effect with the high efficiency of the second half-wave rectifier circuit B2.

In the cases of continuously controlling the frequency in accordance with the output, the lower frequencies may fall below 17 kHz and produce noise. According to the present embodiment, in contrast, the two-level (or multilevel) control makes it possible to fix the lower frequency to a desired value and thereby avoid any noise production.

Moreover, according to the present embodiment, both the lower frequency setting and the higher frequency setting can be easily changed by selecting the resistances of the resistance changing circuit 50 appropriately. It is therefore possible to flexibly determine the frequency for the rated output (in stationary mode) at two levels depending on requirements on the load side. The switching timing can also be flexibly set by modifying the settings on the reference resistor R81 of the comparison circuit 40, and the resistor R82 and the capacitor C76 of the DC signal level conversion circuit 30. The switching power supply unit 1 is thus extremely easy to make design changes to that corresponding to specification requirements on the load side.

The present embodiment has dealt with the case in which the transformer circuit uses the transformer T1 that has the mutually-insulated primary and secondary windings. The present invention is not limited to a switching power supply unit of insulated type, however, but may also be applied to switching power supply units of non-insulated type which use a chopper transformer circuit or the like.

The present embodiment has only dealt with the case in which the switching power supply unit 1 functions as a flyback converter. The present invention is not limited thereto, however, but may be applied to forward converters. In this case, the positive terminal on the secondary winding side of the transformer T1 is connected to the rectifying diode D21 and the energy-storing reactance L21 in series. A diode for conducting a flywheel current and a current-storing capacitor are preferably arranged across the positive and negative terminals of the secondary winding with the reactance L21 interposed therebetween. Moreover, the present embodiment has only dealt with the case in which the power saving circuit is applied to a switching power supply unit. The present invention is not limited thereto, however, but may be applied to other applications.

It should be appreciated that the power saving circuit and the switching power supply unit according to the present invention are not limited to the foregoing embodiment, and various modifications may be made without departing from the gist of the present invention.

The switching power supply unit of the present invention is applicable to electronic devices and the like that require power saving.

The entire disclosure of Japanese Patent Application No. 2006-298392 and No. 2006-298400 filed on Nov. 2, 2006 including specification, claims, drawings, and summary are incorporated herein by reference in its entirety.

What is claimed is:

1. A switching power supply unit comprising:
   a rectifier circuit for rectifying an alternating current from an AC power source into a direct current;
   a switching circuit for switching the current rectified by the rectifier circuit using a switching device;
   a pulse oscillator circuit for outputting a switching signal to the switching device;

a transformer circuit for stepping a voltage up or down using the current switched by the switching circuit; and a frequency switching unit for detecting a pulse output of the switching circuit of a primary side of the transformer circuit and changing a resistance using a resistor based on a state of the pulse output, thereby switching a frequency of the switching signal in the pulse oscillator circuit, wherein the frequency switching unit includes:

an output detection circuit for detecting the pulse output of the switching circuit;

a DC signal level conversion circuit for converting the pulse output detected by the output detection circuit into a DC signal level;

a comparison circuit for comparing the DC signal level converted by the DC signal level conversion circuit with a reference voltage; and a resistance changing circuit for starting the frequency of the switching signal in the pulse oscillator circuit with low frequency by changing the resistance if the DC signal level does not reach the reference voltage when starting the pulse output to oscillate, thereafter changing the resistance if the DC signal level reaches the reference voltage, thereby switching the frequency of the switching signal in the pulse oscillator circuit to high frequency.

2. The switching power supply unit according to claim 1, wherein the resistance changing circuit reduces the resistance of the resistor to increase the frequency of the switching signal when the DC signal level reaches the reference voltage.

3. The switching power supply unit according to claim 1, wherein the resistance changing circuit is capable of changing the resistance in a plurality of levels.

4. The switching power supply unit according to claim 1, wherein the resistance changing circuit includes a first resistor and a second resistor selectively connectable to the first resistor in parallel, the resistance changing circuit connects the first resistor alone to set the switching signal to a low frequency if the DC signal level does not reach the reference voltage, and connects the first resistor and the second resistor in parallel to set the switching signal to a high frequency if the DC signal level reaches the reference voltage.

5. The switching power supply unit according to claim 1, wherein the output detection circuit detects, as the pulse output, either one of a pulse voltage to be applied to the switching circuit and a pulse current of the switching circuit intended for over current detection.

6. The switching power supply unit according to claim 1, wherein the comparison circuit includes a bias circuit for applying a bias voltage to the DC signal level depending on the result of the comparison.

7. The switching power supply unit according to claim 1, further comprising an external control circuit capable of forcefully changing the resistance of the frequency switching unit in response to an external signal.

8. The switching power supply unit according to claim 1, further comprising a series capacitor connected at one end thereof to an AC terminal of the rectifier circuit, and half-wave rectifier means having a single AC terminal connected to the other end of the series capacitor, wherein the half-wave rectifier means includes a first diode interposed between the single AC terminal and a positive DC terminal so as to pass a current from the single AC terminal to the positive DC terminal, and a second diode interposed between the single AC terminal and a negative DC terminal so as to pass a current from the negative DC terminal to the single AC terminal, and wherein the pulse oscillator circuit is connected between the positive DC terminal and the negative DC terminal of the half-wave rectifier means, and a negative DC terminal of the rectifier circuit is connected to the negative DC terminal of the half-wave rectifier means.

9. The switching power supply unit according to claim 1, wherein the pulse oscillator circuit is connected between both ends of an auxiliary winding of the transformer.

10. The switching power supply unit according to claim 1, comprising a power saving circuit comprising:

the rectifier being connected to an AC terminal of the AC power source;

the switching circuit;

the pulse oscillator circuit;

a series capacitor connected at one end to the AC terminal; and a half-wave rectifier means having a single AC terminal connected to the other end of the series capacitor, wherein the half-wave rectifier means includes a first diode interposed between the single AC terminal and a positive DC terminal so as to pass a current from the single AC terminal to the positive DC terminal, and a second diode interposed between the single AC terminal and a negative DC terminal so as to pass a current from the negative DC terminal to the single AC terminal, and wherein the pulse oscillator circuit is connected between the positive DC terminal and the negative DC terminal of the half-wave rectifier means, and a negative DC terminal of the rectifier circuit is connected to the negative DC terminal of the half-wave rectifier means;

the pulse oscillator circuit has a difference between its starting voltage and stop voltage such that the starting voltage is set to be higher and the stop voltage lower;

a smoothing capacitor is connected between the positive DC terminal and the negative DC terminal of the half-wave rectifier circuit, and functions as a DC power source of the pulse oscillator circuit through being charged by the rectifying operation of the half-wave rectifier circuit, and the pulse oscillator circuit repeats the ON and OFF operations intermittently in standby mode such that the pulse oscillator circuit starts to oscillate if a DC voltage of the smoothing capacitor charged by the half-wave rectifier means reaches the starting voltage, and the pulse oscillator circuit is stopped if the DC voltage of the smoothing capacitor falls below the stop voltage because of consumption of power caused by the oscillation.

11. The switching power supply unit according to claim 10, wherein the power saving circuit further comprises the transformer, and the pulse oscillator circuit is connected between both ends of an auxiliary winding of the transformer.

12. The switching power supply unit according to claim 10, wherein the power saving circuit further comprises the frequency switching unit.

13. A method for setting a switching frequency of a switching device in a switching power supply unit, the method comprising the steps of:

connecting a resistance changing circuit to a frequency setting terminal of a pulse oscillator circuit for outputting a switching signal to the switching device, the resistance changing circuit being capable of changing a resistance by using a resistor;

detecting a pulse output of a switching circuit of a primary side of a transformer circuit;

converting the pulse output detected into a DC signal level;

comparing the DC signal level converted with a reference voltage;

starting the pulse oscillator circuit to oscillate while the resistance changing circuit makes the switching signal start with a low frequency by changing a resistance if the DC signal level does not reach the reference voltage; and when an output increases after starting, changing the resistance of the resistance changing circuit if the DC signal level reaches the reference voltage so that the switching signal shifts to a high frequency.

* * * * *